No. 789,715. PATENTED MAY 16, 1905.
A. G. CASSIDY.
PNEUMATIC TROLLEY CHECK.
APPLICATION FILED NOV. 5, 1904.
4 SHEETS—SHEET 1.
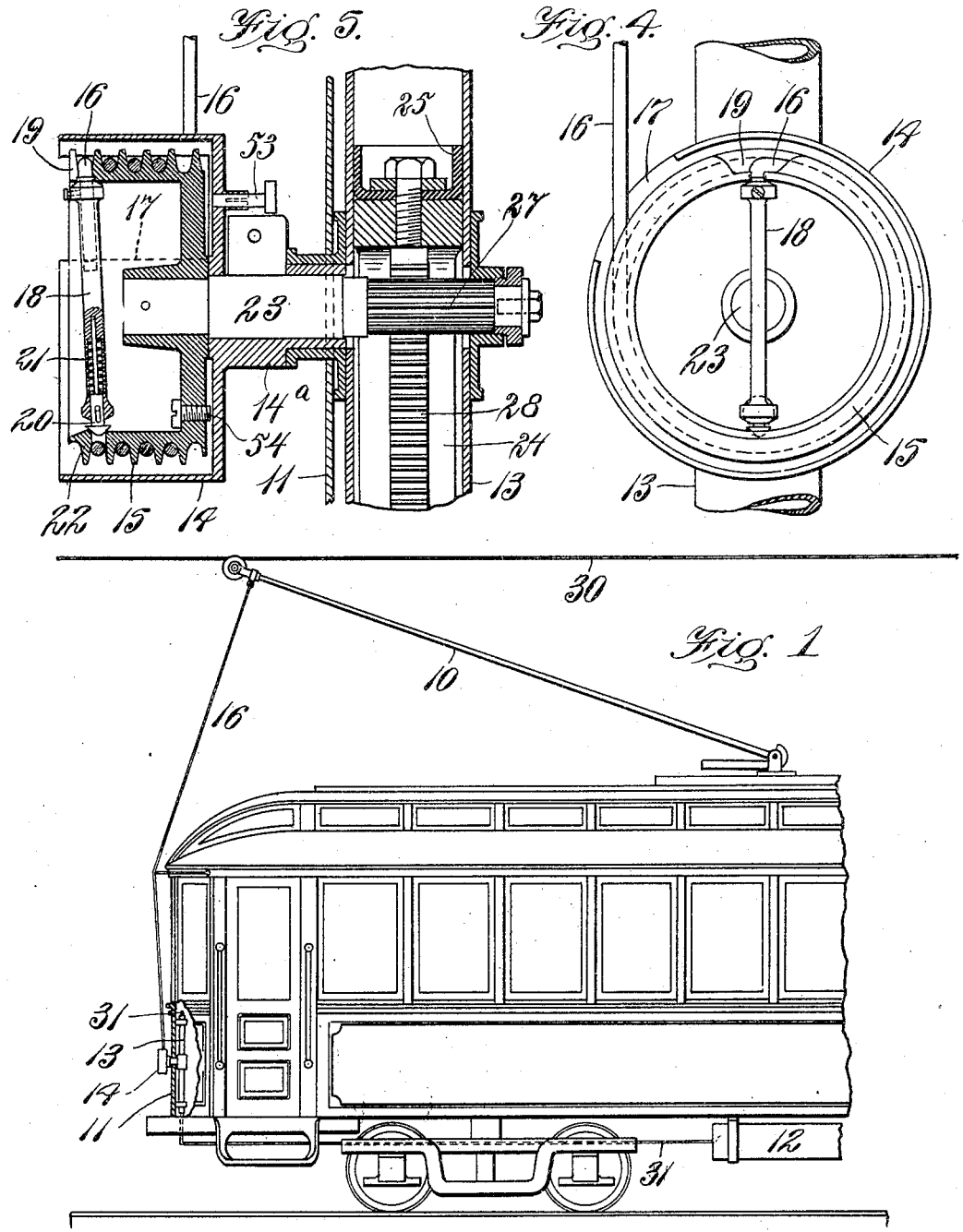

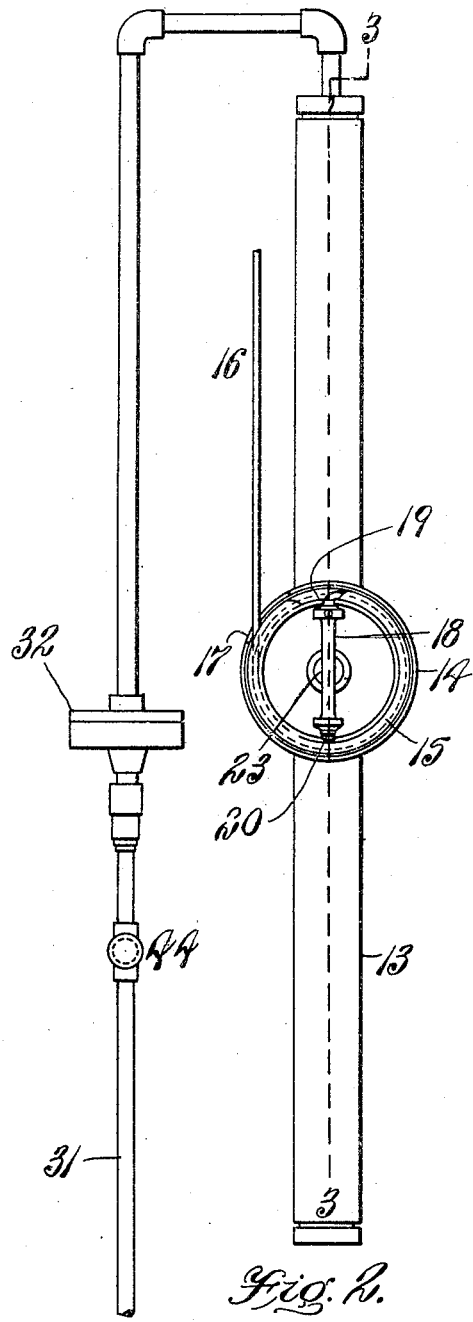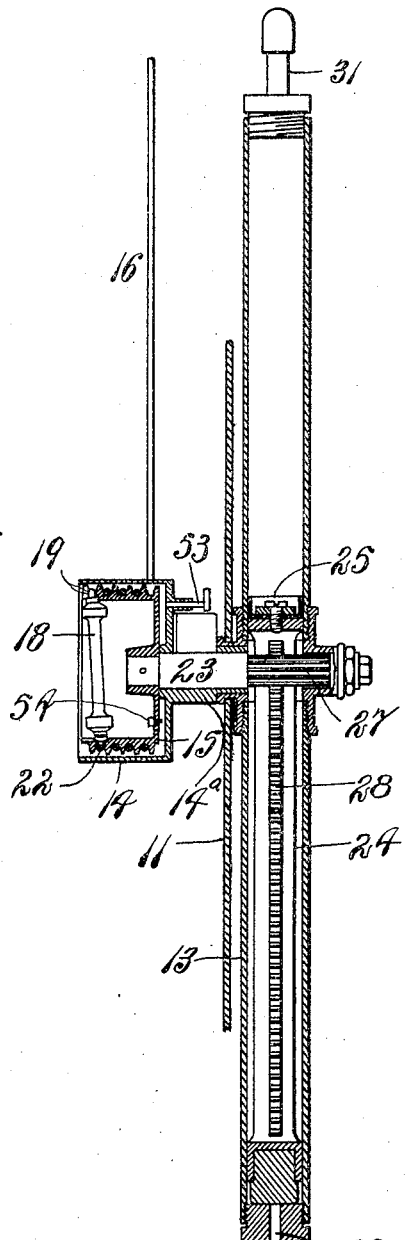

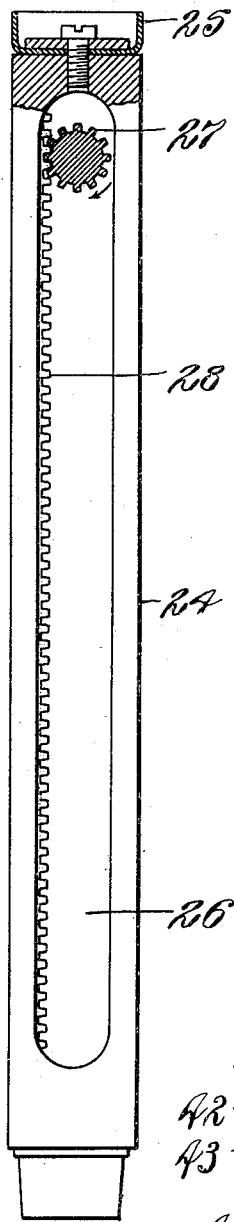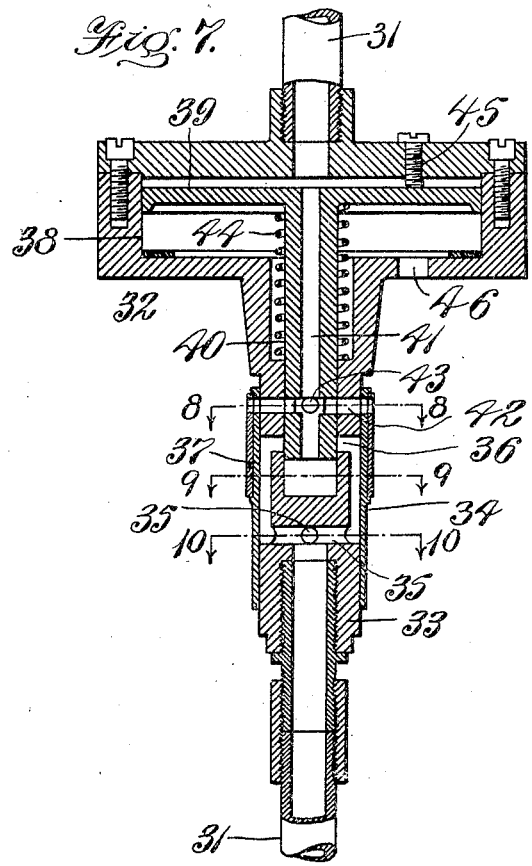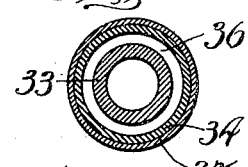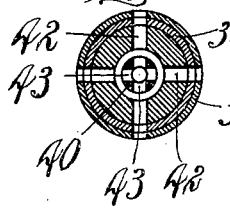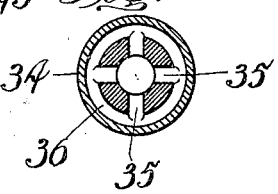

No. 789,715. PATENTED MAY 16, 1905.
A. G. CASSIDY.
PNEUMATIC TROLLEY CHECK.
APPLICATION FILED NOV. 5, 1904.
4 SHEETS—SHEET 4.
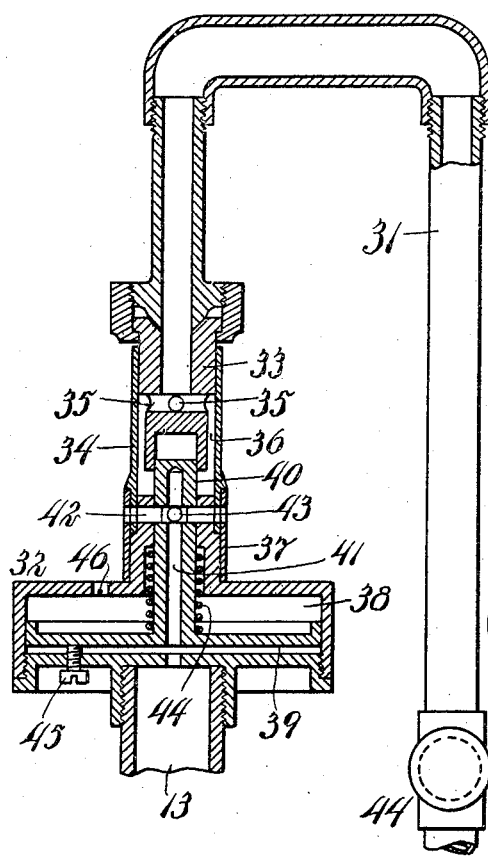
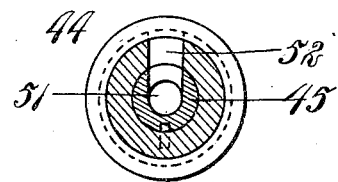

No. 789,715. Patented May 16, 1905.

UNITED STATES PATENT OFFICE.

ANDREW G. CASSIDY, OF WALTHAM, MASSACHUSETTS.

PNEUMATIC TROLLEY-CHECK.

SPECIFICATION forming part of Letters Patent No. 789,715, dated May 16, 1905.

Application filed November 5, 1904. Serial No. 231,509.

*To all whom it may concern:*

Be it known that I, ANDREW G. CASSIDY, of Waltham, in the county of Middlesex and State of Massachusetts, have invented certain new and useful Improvements in Pneumatic Trolley-Checks, of which the following is a specification.

The present invention relates to devices known as "trolley-checks"—devices which are adapted to be attached to electric trolley-cars and connected by cords to the trolley-poles.

The form of trolley-check now generally in use is adapted to allow the trolley to play up and down slowly to accommodate itself to the sagging of the trolley-wire between the supports and to positively secure the trolley-cord when the trolley-pole "jumps the wire" and springs upwardly. Under the conditions just recited the upper end of the trolley-pole is held wherever it is caught. This position may be from one to three feet above the trolley-wire, so that the pole is bound to strike all the trolley-supporting members under which the car passes before the pole is manually drawn down. While this form of device holds the pole at a comparatively gradual inclination, the pole is bound to be more or less damaged by striking any objects in its path. In case the trolley-wire is hung from arms or brackets the damage is more likely to come upon the trolley-pole; but where cross-wires are employed to support the trolley they are in danger of being snapped by the trolley-pole. In any event the pole is almost invariably bent and ultimately broken. The pole is not held down by the device referred to at the position where the preceding support forces it, but rises again, until checked as at first, once more across the line of the trolley-supports.

The object of the present invention, however, is to not only check the trolley-pole when it flies up, but to draw it down again below the level of the wire, so that it is not in position to strike any objects above the wire regardless of the distance traveled thereafter. It must be stated, however, that the present invention is especially adapted to cars having air-brakes, although a tank or reservoir for compressed air or suitable gas may be installed and charged from time to time by any convenient method. A comparatively small tank of compressed air is sufficient to operate from ten to twenty times.

Referring to the accompanying drawings, Figure 1 shows a portion of a trolley-car equipped with the invention. Fig. 2 is a rear elevation of the operating parts detached from the dasher. Fig. 3 is a vertical section on the line 3 3 of Fig. 2 as the parts appear when the trolley is drawn down thereby. Figs. 4 and 5 are portions of Figs. 2 and 3 on an enlarged scale. Fig. 6 is a detail view of the piston-plunger. Fig. 7 is a vertical section of the automatic air-controlling valve shown in Fig. 2. Figs. 8, 9, and 10 are cross-sectional details on the lines 8 8, 9 9, and 10 10, Fig. 7. Fig. 11 is similar to Fig. 8, except that the parts provide a larger opening. Figs. 12 and 13 show the releasing-valve in two positions. Fig. 14 is a section on line 14 14 of Fig. 12. Fig. 15 is a fragment of Fig. 5, somewhat enlarged. Fig. 16 is a modification showing the automatic controlling-valve attached directly to the top of the dasher-cylinder.

The same reference characters indicate the same parts wherever they occur.

Referring to Fig. 1, the car illustrated comprises the usual trolley-pole 10 and dashers 11, of which one only appears. The car is also equipped with a reservoir 12 for compressed air or gas, which may be supplied by any preferable method. On the inner side of each dasher 11 is affixed a tube or cylinder 13, to which, midway between its ends, is attached the neck 14ª of a casing 14 containing a winding-drum 15. The cord 16, by which the trolley-pole 10 is pulled down, is adapted to be connected to either one or the other of the winding-drums 15. For this reason the outer end of the casing and drum is left open, and a slot 17, open at the end, is formed in the edge of the casing to permit the insertion and removal of the cord 16. To facilitate the attaching of the cord, I provide a metal tip 18 for the end thereof. The tip 18 is adapted to be inserted diametrically in the drum, so that the cord extends through a slot 19 in the edge thereof. A plunger 20 in the end of the tip is adapted to be forced by a spring 21 into an aperture 22 in the drum opposite the slot 19, and so to prevent the tip from being accidentally dislodged. The drum is affixed to a shaft 23, which is journaled in the neck 14ª of the casing and which projects into the tube or cylinder 13. Said cylinder contains a plunger 24, having a piston 25 and a slot 26 extending longitudinally thereof. (See Figs. 3, 5, and 6.) The end of the shaft 23 which extends into the cylinder 13 is in the form of a pinion 27 and occupies the slot 26 in the plunger 24. A rack 28, formed on one inner face of the plunger, intermeshes with the pinion 27, whereby the weight of the plunger normally causes the drum to wind upon itself the slack cord 16. It will be observed now that the drum, actuated as it is by the gravity of the plunger, is adapted to give and take the cord 16 as the trolley rises and falls to the undulations of the trolley-wire 30. The cylinder 13 is provided with a vent 29 at its lower end and also an automatic vent, hereinafter described, at its upper end to forestall any creation of an air-cushion in the cylinder.

The means for automatically pulling down the trolley-pole when it jumps the wire is as follows: Communication is formed between the reservoir 12 and the upper end of the cylinder 13 by a conduit 31, including an automatic piston-valve in a casing 32 (see Figs. 1, 2, and 7) and a double-acting releasing-valve hereinafter described. Said automatic valve in its normal position prevents the flow of air from the reservoir 12, but allows the escape of air from the upper end of the cylinder 13, as previously stated in connection with the vents therein.

The normal position of the valve is illustrated in Fig. 7. The supply-conduit 31 terminates in a plug 33, contained in a sleeve 34, connected to the valve-casing 32. Radial ports 35 form communication from the interior of the plug to a chamber 36 between it and the sleeve 34. The plug 33 is of such length as to reach not quite to the valve-casing 32, thereby permitting the chamber 36 to entirely surround the end of said plug.

Referring to the means for controlling the flow of air through the sleeve 34, the other end of the valve-casing 32 is enlarged, so as to form a cylindrical chamber 38 of short axis. A plunger-valve 40, having a piston 39 arranged to occupy the chamber 38, is installed in the valve-casing. Said valve projects from said casing across the space 36 and terminates in the plug 33, which is cupped to receive it. A duct 41 extends longitudinally through the valve 40; but as the projecting end of the valve is inclosed in the plug 33 communication therefrom with the interior of the sleeve 34 is cut off.

Communication between the valve-casing 32 and the cylinder 13 is through the chamber 38. Radial ports 42 extend through the casing 32 and sleeve 34 where they overlap, thus forming communication between the interior of the casing and the atmosphere. The valve 40 is also provided with radial ports 43, which are adapted to register with the ports 42 when the valve is in its normal position. Thus communication is completed between the cylinder 13 and the atmosphere, so that the plunger 24 is enabled to play slowly up and down, as stated, without creating an opposing air-cushion. The valve 40 is held in its normal or inoperative position by a spring 44, interposed between the piston 39 and the casing 32. A screw 45, projecting through the cap of the cylinder 38, is adapted to limit the upward movement of the piston and valve 40, thereby causing the ports 43 to normally register correctly with the ports 42, and so maintain the full opening into the atmosphere. 37 is a rotatable sleeve over the sleeve 34 and having apertures forming continuations of the ports 42. Said outer sleeve is adapted to be adjusted to open or close the ports more or less, as conditions require. (See Figs. 8 and 11.)

The operation of the valve 40 is as follows: If the trolley-pole 10 jumps off the wire 30 and springs upward, the cord 16 imparts a sudden rotation to the drum 15. The drum in turn causes a sudden upward movement of the plunger 24 and piston 25. The column of air between the piston 25 and the piston 39 is thereby compressed greatly in excess of the leakage through the valve 40 and ports 42 43. The pressure therefore accumulates in the cylinder 38 and forces the piston 39 against the pressure of the spring 44. A vent 46 in the chamber 38 dispels a cushion of air which would otherwise form and oppose the movement of the piston 39. Continued movement of the piston 39 and valve 40 moves the ports 42 beyond the ports 43, thereby cutting off the leakage therethrough. The piston 39 is thereby subjected to the full pressure produced by the plunger 24, and the valve 40 is further moved until the ports 43 enter the space 36, which contains the air or gas from the reservoir 12 under greater compression than that produced by the plunger 24. Closed communication between the reservoir 12 and the cylinder 13 is thus established, and the back pressure in the cylinder 13 forces the plunger 24 downwardly. The rotation of the drum 15 is reversed, thus drawing down and holding the trolley-pole below the level of the trolley-wire. So long as the communication between the reservoir 12 and cylinder 13 is undisturbed after the pulling-down operation the trolley-pole cannot be replaced on the wire. In order to release the trolley-pole once more, the pressure on the piston 25 must be shut off and allowed to escape. To accomplish this result, a double-acting releasing-valve 44, previously mentioned, is installed in the conduit 31 between the reservoir and the automatic valve 40. The valve 44 is located, preferably, at the side of the cylinder 13 and is operable manually on either side of the dasher, one end of said valve projecting through the dasher for that purpose. (See Figs. 12 and 13.)

The valve 44 comprises a casing which forms a portion of the conduit 31, and a double-acting plunger 45, movable in said casing transversely of said conduit. A port 46, extending straight through said plunger, normally registers with a port 47 in the casing 44, thereby forming, together with said port 47, continuous communication through the conduit 31. Both ends of the plunger project from the casing 45 through screw-caps 48. Springs 49, interposed between said caps and collars 50 on the plunger, serve to normally centralize said plunger, and so cause the port 46 to register with the port 47. On each side of the central portion of the plunger 45 is an outlet-port 51. Said ports extend toward the extremities of the plunger, but open into the atmosphere preferably before reaching the said extremities. It will be seen now that the plunger may be pushed from either end to cut off the supply in the conduit 31 and that as a result either one or the other of the ports 51 may register with the port 47, and thus provide an escape for the air already under pressure in the cylinder 13. The outlets of the ports 51 when in operative position are within the casing, and hence to provide an escape for the air discharged from said ports slots 52 are cut in the screw-caps 48. (See Figs. 12, 13, and 14.)

Referring to Figs. 3 and 5, it will be seen that there is a plunger or stud 53 mounted in the rear wall of the drum-casing 14. Said stud is adapted to be pushed into the path of rotation of a stop 54, projecting from the winding-drum, and so arrest the rotation thereof. It is used after detaching the trolley-cord from the winding-drum to prevent the drum from running back, as it otherwise would. The drum is thus held in position ready for the cord to be attached at some other time.

The operation for detaching the trolley-cord from the drum is as follows: The plunger-valve 44 is first actuated manually to render the automatic valve 40 inoperative and to release the air already in the cylinder 13. With the valve 44 still in this position the cord is drawn off from the drum and the valve released. The stud 53 is then pushed in to prevent reverse rotation of the drum and the cord-tip 18 removed from its fastening.

Having thus explained the nature of the invention and described a way of constructing and using the same, although without attempting to set forth all of the forms in which it may be made or all of the modes of its use, I declare that what I claim is—

1. In a trolley-controller of the character described, a cylinder having therein a piston with a rack-bar, a pinion engaging said rack-bar, a shaft connected to said pinion and projecting laterally outside of said cylinder, and a winding-drum on the exterior portion of said shaft for the trolley-cord, said drum being exposed for the attachment and detachment of the end of the trolley-cord, in combination with a source of fluid under pressure, a conduit connecting said source with the cylinder to deliver fluid under pressure thereto to move the piston and thereby rotate said winding-drum, a normally closed valve in said conduit for cutting off the fluid from the cylinder, and means operated by an excess of pressure in said cylinder for opening said valve to effect the delivery of fluid to said cylinder.

2. In a trolley-controller, the combination with a cylinder, a piston, and means operated by the piston for drawing the trolley-pole downward, of a source of fluid under pressure, a conduit connecting said source with the said cylinder, and valve mechanism placed in said conduit and comprising a valve-cylinder having a fluid-operated piston-valve with an open port therethrough, an escape-port with which the open port normally registers, and a supply-port with which said open port does not normally register, all being arranged as described, whereby an excess of pressure in the first-mentioned cylinder moves said piston-valve to cut off the escape-port and open the supply-port to supply fluid through said open port in the piston-valve to the first-mentioned cylinder.

3. In a trolley-controller, the combination with a cylinder, a piston, and means operated by the piston for drawing the trolley-pole downward, of a source of fluid under pressure, a conduit connecting said source with the said cylinder, and valve mechanism placed in said conduit and comprising a valve-cylinder communicating with the first-mentioned cylinder, a valve-piston therein having an open aperture therethrough, a casing communicating with said source of supply and having a supply-port and a leakage-port adapted to alternately communicate with said aperture in the valve-piston, and means for controlling the area of the waste-port.

4. In a trolley-controller, the combination with a cylinder, a piston, and means operated by the piston for drawing the trolley-pole downward, of a source of fluid under pressure, a conduit connecting said source with the said cylinder, and valve mechanism placed in said conduit and comprising a valve-cylinder of relatively large cross-sectional area as compared with the conduit and communicating with the first-mentioned cylinder, a piston-valve in said cylinder having a stem, there being a small open aperture through the valve and stem for the free leakage of fluid into and out of the said first-mentioned cylinder, and a casing having a leakage-port leading to the atmosphere and with which said aperture normally communicates, and a supply-port communicating with the source of supply, which is normally closed, but which is opened upon the closure of the leakage-port by the operation of the valve-piston due to a sudden increase in pressure in the first-mentioned cylinder and in the valve-cylinder.

5. In a trolley-controller of the character described, a winding-arm, means connected with said drum for automatically winding said drum when the trolley slips from the wire to draw the trolley downward below the wire, said drum having an opening in its end, and a trolley-cord having a lock adapted to be placed in said opening, with means to engage the opposing walls of the opening in said drum.

6. In a trolley-controller of the character described, comprising a cylinder adapted to be affixed to a car, a supply of fluid under pressure, a conduit for the fluid opening into one end of said cylinder, a piston in the cylinder adapted to be connected with the trolley-pole so as to rise and fall therewith, a valve in said conduit, a leakage-port which normally communicates with said cylinder and which is opened when the valve is closed to cut off the supply of fluid under pressure, means actuated by a pressure in the cylinder in excess of the leakage through said port to open said valve, and a double-acting waste-valve in the conduit adapted to be affixed to the dashboard of the car so as to be accessible from either side thereof for permitting the escape of fluid from said cylinder.

In testimony whereof I have affixed my signature in presence of two witnesses.

ANDREW G. CASSIDY.

Witnesses:
CHARLES E. COLLIGAN,
THOMAS H. TURNEY.